(12) United States Patent
Umeyama et al.

(10) Patent No.: US 9,905,846 B2
(45) Date of Patent: Feb. 27, 2018

(54) LITHIUM ION SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Naoto Onodera, Hirakata (JP); Naoyuki Wada, Hirakata (JP); Yusuke Fukumoto, Toyonaka (JP); Tatsuya Hashimoto, Osaka (JP); Yuji Yokoyama, Moriguchi (JP); Hideki Sano, Ikeda (JP)

(73) Assignee: TOYOTA JIDOSHA KABUSHIKI KAISHA, Toyota-Shi, Aichi-ken (JP)

( * ) Notice: Subject to any disclaimer, the term of this patent is extended or adjusted under 35 U.S.C. 154(b) by 0 days.

(21) Appl. No.: 15/061,014

(22) Filed: Mar. 4, 2016

(65) Prior Publication Data

US 2016/0260974 A1 Sep. 8, 2016

(30) Foreign Application Priority Data

Mar. 6, 2015 (JP) ................................ 2015-044444

(51) Int. Cl.
| | |
|---|---|
| *H01M 4/36* | (2006.01) |
| *H01M 4/62* | (2006.01) |
| *H01M 10/0568* | (2010.01) |
| *H01M 10/0525* | (2010.01) |
| *H01M 2/16* | (2006.01) |
| *H01M 10/0569* | (2010.01) |
| *H01M 10/42* | (2006.01) |

(52) U.S. Cl.
CPC ........... *H01M 4/364* (2013.01); *H01M 4/366* (2013.01); *H01M 4/62* (2013.01); *H01M 10/0568* (2013.01); *H01M 2/1673* (2013.01); *H01M 10/0525* (2013.01); *H01M 10/0569* (2013.01); *H01M 10/4235* (2013.01)

(58) Field of Classification Search
CPC .... H01M 4/364; H01M 4/62; H01M 10/0525; H01M 10/0568; H01M 10/0569; H01M 10/4235; H01M 2/1673
See application file for complete search history.

(56) References Cited

U.S. PATENT DOCUMENTS

| | | | | |
|---|---|---|---|---|
| 2002/0122980 A1* | 9/2002 | Fleischer | .......... | H01M 10/0562 429/213 |
| 2012/0308890 A1 | 12/2012 | Okuda et al. | | |
| 2012/0316716 A1 | 12/2012 | Odani et al. | | |
| 2015/0249269 A1 | 9/2015 | Yoon et al. | | |

FOREIGN PATENT DOCUMENTS

| | | |
|---|---|---|
| JP | 2011-210694 A | 10/2011 |
| JP | 2012-248441 A | 12/2012 |
| JP | 2013-016456 A | 1/2013 |
| KR | 10-2014-0066645 A | 6/2014 |
| WO | 2010/098380 A1 | 9/2010 |

OTHER PUBLICATIONS

Uchida, S., et al., "Availability of LiFSI-based Electrolyte with Low EC Content", Proceeding of 54th Battery Symposium in Japan, Oct. 6, 2013, p. 358 (4 pages).
Partial Translation of Notification of Reasons for Refusal dated Apr. 25, 2017, from the Japanese Patent Office in counterpart Japanese application No. 2015-044444.

* cited by examiner

*Primary Examiner* — Laura Weiner
(74) *Attorney, Agent, or Firm* — Sughrue Mion, PLLC

(57) ABSTRACT

A lithium ion secondary battery includes: an electrode mixture layer that contains an electrode active material and an organic ferroelectric having a dielectric constant of 25 or higher; and an electrolytic solution that contains lithium bis(fluorosulfonyl)imide and a nonaqueous solvent. A content of the organic ferroelectric is 0.5 parts by mass to 10 parts by mass with respect to 100 parts by mass of the electrode active material. A proportion of a high-polarity solvent having a dielectric constant of 10 or higher in the nonaqueous solvent is 10 vol % or lower.

1 Claim, 4 Drawing Sheets

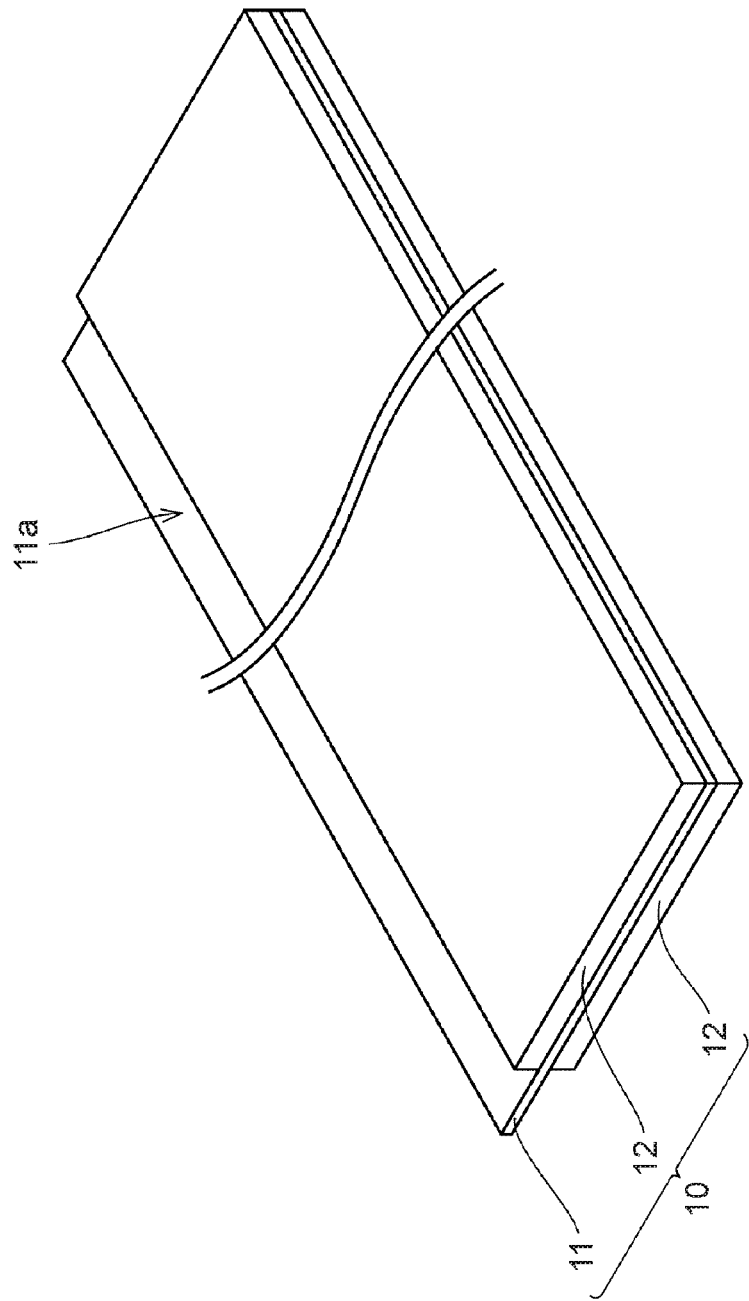

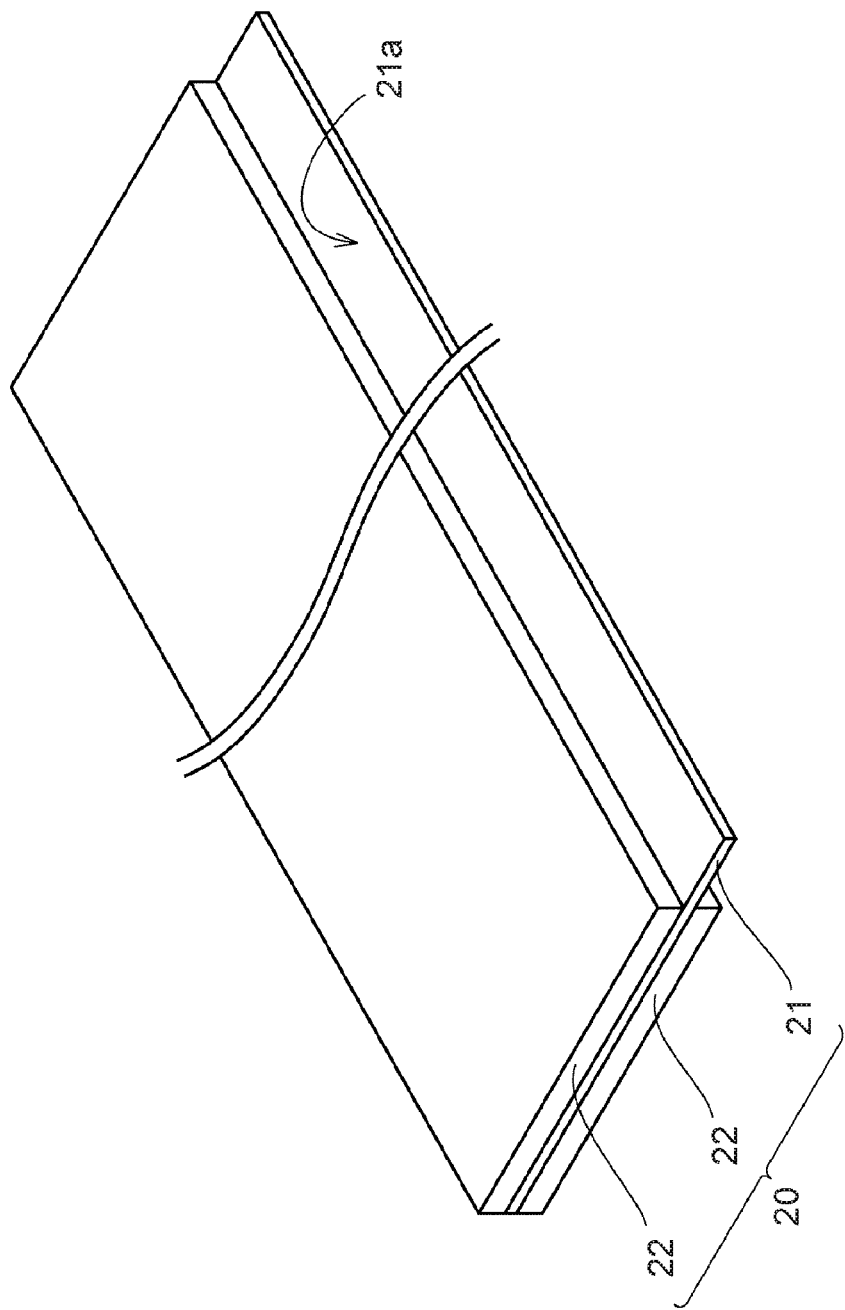

LITHIUM ION SECONDARY BATTERY

INCORPORATION BY REFERENCE

The disclosure of Japanese Patent Application No. 2015-044444 filed on Mar. 6, 2015 including the specification, drawings and abstract is incorporated herein by reference in its entirety.

BACKGROUND OF THE INVENTION

1. Field of the Invention

The present invention relates to a lithium ion secondary battery.

2. Description of Related Art

Japanese Patent Application Publication No. 2011-210694 (JP 2011-210694 A) discloses a technique in which an inorganic ferroelectric having a dielectric constant of 500 or higher is sintered on a surface of a positive electrode active material.

An electrolytic solution for a lithium ion secondary battery is an ion conductor in which a lithium (Li) salt is dissolved in a nonaqueous solvent. In the electrolytic solution, the Li salt is ionized into Li ions (cations) and counter anions. However, actually, ion association which is a reverse reaction to ionization occurs, and thus complete ionization does not occur. In the electrolytic solution, the number of ionized free ions is large, and as the movement of free ions becomes faster, the electrical conductivity increases.

According to JP 2011-210694 A, the inorganic ferroelectric is sintered on the surface of the positive electrode active material. As a result, in an interface between the positive electrode active material and the electrolytic solution, the ionization of the Li salt is promoted, and output characteristics of a battery are improved. However, output characteristics are not insufficient for an application such as a vehicle-mounted battery where extremely high output characteristics are required.

SUMMARY OF THE INVENTION

The invention provides a lithium ion secondary battery having superior output characteristics.

According to an aspect of the invention, there is provided a lithium ion secondary battery including an electrode mixture layer that contains an electrode active material and an organic ferroelectric having a dielectric constant of 25 or higher. This lithium ion secondary battery further includes an electrolytic solution that contains lithium bis(fluorosulfonyl)imide and a nonaqueous solvent. A content of the organic ferroelectric is 0.5 parts by mass to 10 parts by mass with respect to 100 parts by mass of the electrode active material. A proportion of a high-polarity solvent having a dielectric constant of 10 or higher in the nonaqueous solvent is 10 vol % or lower.

In the related art, as a nonaqueous solvent of an electrolytic solution, a mixed solvent in which a high-polarity solvent having a high dielectric constant and a low-polarity solvent having a low dielectric constant are mixed with each other is adopted. The reason for this is as follows. As the dielectric constant of a solvent increases, an electrostatic interaction between Li ions and counter anions becomes weakened, which promotes the ionization of a Li salt. However, the high-polarity solvent has high viscosity due to its high polarity. Therefore, when the proportion of the high-polarity solvent is high, the ionic mobility decreases, and a desired electrical conductivity cannot be obtained. Thus, by mixing the low-polarity solvent having low viscosity with the high-polarity solvent, the number of free ions and the ionic mobility become well-balanced. As a result, it is necessary that the proportion of a high-polarity solvent in a nonaqueous solvent of an electrolytic solution of the related art is about 20 vol % to 40 vol %.

In the electrolytic solution according to the invention, the proportion of the high-polarity solvent is extremely lower than that in the related art. In the invention, the proportion of the high-polarity solvent is 10 vol % or lower and may be 0 vol %. As a result, the viscosity of the solvent is significantly low, and the ionic mobility is improved.

Further, in the invention, a specific Li salt is used, and the organic ferroelectric is added to the electrode mixture layer. As a result, the number of ionized free ions is large. In the invention, lithium bis(fluorosulfonyl)imide (hereinafter, abbreviated as "LiFSI") is used as the Li salt. In LiFSI, the ionic radius of counter anions is greater than that of counter anions (e.g., $PF_6$) of the related art, and ion association is not likely to occur. Accordingly, by using LiFSI, improvement of the degree of ionization can be expected. Here, it is presumed that, when the ionic radius of counter anion is large, the ionic mobility naturally decreases. As described above, in the invention, a solvent having low viscosity is used in which the proportion of the high-polarity solvent is extremely low. As a result, a decrease in ionic mobility can be prevented. Further, in the present invention, the organic ferroelectric contained in the electrode mixture layer further promotes the ionization of LiFSI. As a result, the number of free ions can be increased while using an electrolytic solution in which the proportion of the high-polarity solvent is extremely low.

The organic ferroelectric is soluble in a solvent (for example, water or N-methyl-2-pyrrolidone) used during the preparation of an electrode mixture paste. Therefore, by adding the organic ferroelectric to an electrode mixture paste, an electrode mixture layer in which the organic ferroelectric is uniformly dispersed can be formed. As a result, an electrode reaction is uniform, and high output can be exhibited, for example, in a low-temperature environment.

At this time, when an inorganic ferroelectric such as barium titanate ($BaTiO_3$) is used instead of the organic ferroelectric, the effect is extremely limited. The inorganic ferroelectric has low solubility in the above-described solvent. Therefore, when a small amount of the inorganic ferroelectric is added, it is difficult to uniformly disperse the inorganic ferroelectric in an electrode mixture layer. When the distribution of the inorganic ferroelectric in the electrode mixture layer is non-uniform, an electrode reaction is non-uniform, and high output cannot be exhibited. Such a tendency is significant particularly in a low-temperature environment. In order to uniformly disperse the inorganic ferroelectric in the electrode mixture layer, it is necessary that a large amount of the inorganic ferroelectric is added. The inorganic ferroelectric acts as an insulator for the DC voltage. Therefore, when a large amount of the inorganic ferroelectric is added, the electron conductivity decreases, and output characteristics decrease.

According to investigation by the present inventors, a sufficient ionization promoting effect can be exhibited even when the organic ferroelectric is added in a small amount of 0.5 parts by mass with respect to 100 parts by mass of the electrode active material. However, when the content of the organic ferroelectric in the electrode mixture layer is higher than 10 parts by mass, an active site of the electrode active material is covered with the organic ferroelectric, and superiority in output characteristics may be eliminated. Therefore, in the invention, the content of the organic ferroelectric is limited to a range of 0.5 parts by mass to 10 parts by mass with respect to 100 parts by mass of the electrode active material.

Here, "electrode mixture layer" described in the invention refers to at least one of a positive electrode mixture layer and a negative electrode mixture layer. When the electrode mixture layer is a positive electrode mixture layer, the electrode active material refers to a positive electrode active material. When the electrode mixture layer is a negative electrode mixture layer, the electrode active material refers to a negative electrode active material.

The organic ferroelectric may contain at least one selected from the group consisting of bromanilic acid, phenazine-chloranilic acid, and croconic acid. A significant ionization promoting effect can be expected due to the organic ferroelectric.

According to the above-described configuration, a lithium ion secondary battery having superior output characteristics can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a schematic diagram showing a configuration example of a positive electrode according to the embodiment of the invention; and FIG. 4 is a schematic diagram showing a configuration example of a negative electrode according to the embodiment of the invention.

DETAILED DESCRIPTION OF EMBODIMENTS

Hereinafter, an embodiment of the invention (hereinafter, referred to as "the embodiment") will be described in detail. However, the embodiment is not limited to the following description.

[Lithium Ion Secondary Battery]

Figure 1:
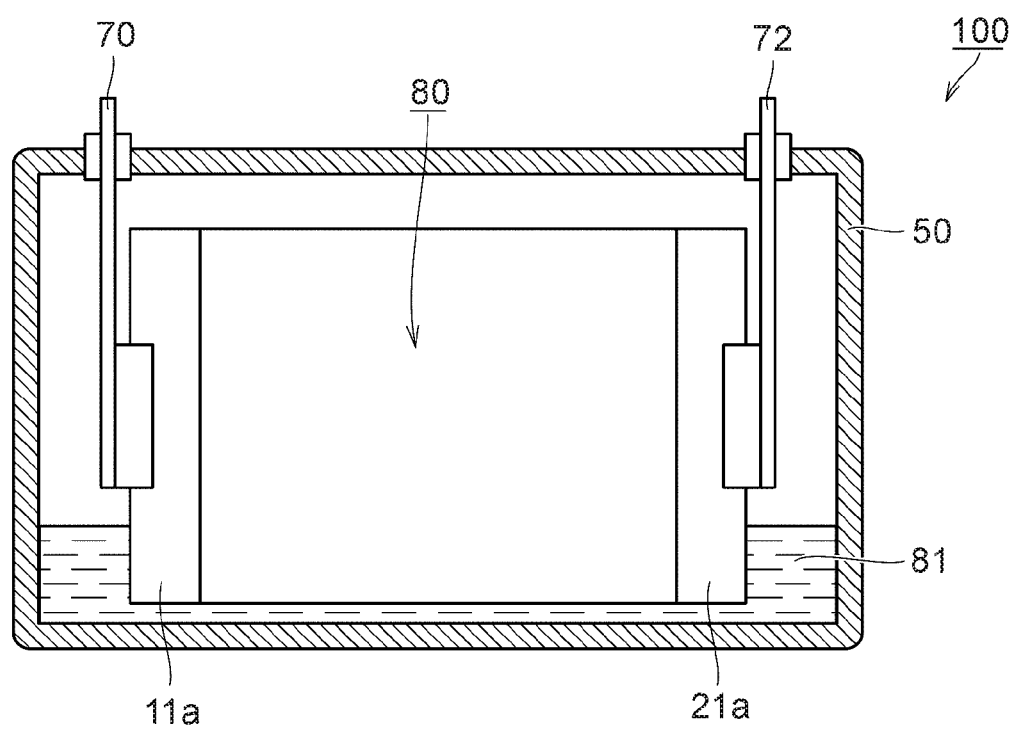
FIG. 1 is a schematic sectional view showing a configuration example of a lithium ion secondary battery according to an embodiment of the invention.

FIG. 1 is a schematic sectional view showing a configuration example of a lithium ion secondary battery (hereinafter, also referred to simply as "battery") according to the embodiment of the invention. As shown in FIG. 1, the battery 100 includes a square case 50. The square case 50 is formed of, for example, an aluminum alloy. A positive electrode terminal 70 and a negative electrode terminal 72 are provided on the square case 50. In the square case 50, for example, a liquid injection hole, a safety valve, and a current interrupt device (all of which are not shown) may be provided. In the square case 50, an electrode body 80 and an electrolytic solution 81 are accommodated. The electrode body 80 is connected to a positive electrode terminal 70 and a negative electrode terminal 72. The electrolytic solution 81 penetrates into the electrode body 80.

Figure 2:
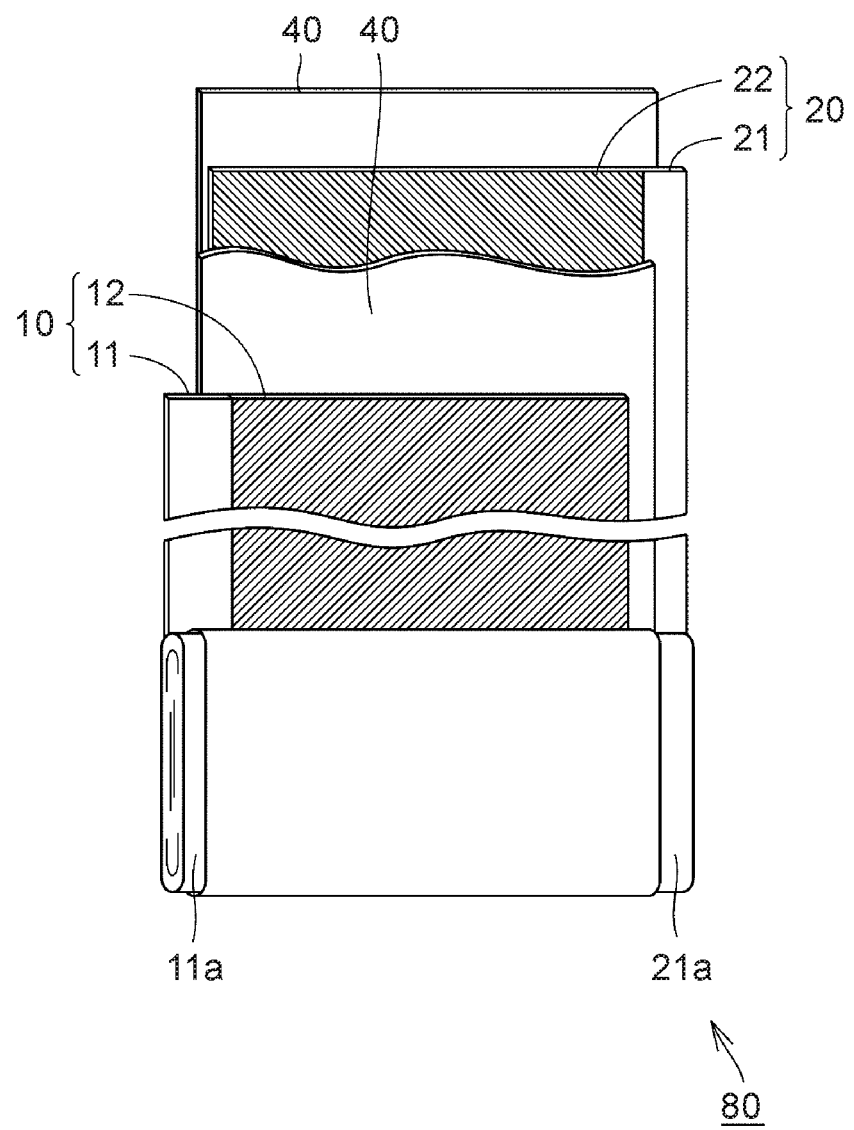
FIG. 2 is a schematic diagram showing a configuration example of an electrode body according to the embodiment of the invention.

FIG. 2 is a schematic diagram showing a configuration example of the electrode body 80. As shown in FIG. 2, the electrode body 80 is a wound electrode body. That is, the electrode body 80 is obtained by laminating the positive electrode 10 and the negative electrode 20 with separators 40 interposed therebetween to obtain a laminate and winding the laminate. The positive electrode 10 includes a positive electrode mixture layer 12. The negative electrode 20 includes a negative electrode mixture layer 22. In the embodiment, at least one of the positive electrode mixture layer 12 and the negative electrode mixture layer 22 contains an organic ferroelectric, and it is preferable that both the positive electrode mixture layer 12 and the negative electrode mixture layer 22 contains an organic ferroelectric.

[Positive Electrode]

FIG. 3 is a schematic diagram showing a configuration example of the positive electrode. As shown in FIG. 3, the positive electrode 10 is an elongated belt-shaped sheet member. The positive electrode 10 includes: a positive electrode current collector foil 11; and a positive electrode mixture layer 12 that is formed on both main surfaces of the positive electrode current collector foil 11. The positive electrode current collector foil is formed of, for example, Al foil. In the positive electrode 10, a foil exposure portion 11a where the positive electrode current collector foil 11 is exposed from the positive electrode mixture layer 12 is a portion for connection with an external terminal (positive electrode terminal 70) in the electrode body 80 (refer to FIGS. 1 and 2).

The positive electrode mixture layer contains a positive electrode active material (electrode active material). The positive electrode active material is not particularly limited. As the positive electrode active material, for example, $LiCoO_2$, $LiNiO_2$, a compound represented by the formula $LiNi_aCo_bO_2$ (wherein, a+b=1, 0<a<1, and 0<b<1), $LiMnO_2$, $LiMn_2O_4$, a compound represented by the formula $LiNi_aCo_bMn_cO_2$ (wherein, a+b+c=1, 0<a<1, 0<b<1, and 0<c<1), or $LiFePO_4$ may be used. Here, as the compound represented by the formula $LiNi_aCo_bMn_cO_2$, for example, $LiNi_{1/3}Co_{1/3}Mn_{1/3}O_2$ can be used. The average particle size of the positive electrode active material is, for example, about 1 μm to 20 μm. In this specification, "average particle size" refers to a particle size (so-called, d50) corresponding to a cumulative value of 50% in a volume particle size distribution measured using a laser diffraction scattering method.

In addition to the positive electrode active material and the organic ferroelectric, the positive electrode mixture layer may further contain, for example, a conductive material and a binder. The conductive material may be, for example, a carbon black such as acetylene black (AB) or thermal black. The content of the conductive material in the positive electrode mixture layer may be, for example, about 1 part by mass to 10 parts by mass with respect to 100 parts by mass of the positive electrode active material. The binder may be, for example, polyvinylidene fluoride (PVDF) or polytetrafluoroethylene (PTFE). The content of the binder in the positive electrode mixture layer may be, for example, about 1 part by mass to 10 parts by mass with respect to 100 parts by mass of the positive electrode active material.

[Organic Ferroelectric]

The positive electrode mixture layer may contain an organic ferroelectric. The organic ferroelectric according to the embodiment is an organic compound having a dielectric constant (∈r) of 25 or higher. It is preferable that the organic ferroelectric is soluble in a solvent such as water or N-methyl-2-pyrrolidone (NMP). By using the organic ferroelectric having high solubility in the solvent, the electrode mixture paste can be uniformly dispersed during the preparation of the electrode mixture paste. As a result, an electrode reaction is uniform, and improvement of output characteristics can be expected. Here, the dielectric constant of the dielectric changes depending on a measurement temperature. Whether or not the dielectric constant is 25 or higher is determined based on the measurement result at a normal temperature (25° C.±5° C.). As the dielectric constant of the organic ferroelectric increases, improvement of an ionization promoting effect can be expected. The upper limit of the dielectric constant is not particularly limited. The upper limit of the dielectric constant is, for example, 10000.

Specific examples of the organic ferroelectric include: a low molecular organic ferroelectric such as croconic acid or bromanilic acid; a bimolecular (also referred to as donor-acceptor type) organic ferroelectric such as phenazine-chloranilic acid; and an imidazole-based organic ferroelectric such as 2-methylbenzimidazole. As an organic ferroelectric of the related art, PVDF is known, and the dielectric constant of PVDF is lower than 25. A high molecular organic ferroelectric such as PVDF has a high operating electric field and may not exhibit a desired ionization promoting effect in the battery.

Croconic acid is a compound represented by the following chemical formula (1) and exhibits a dielectric constant of about 2000 at a normal temperature. Due to its high dielectric constant, croconic acid is particularly preferable as the organic ferroelectric according to the embodiment.

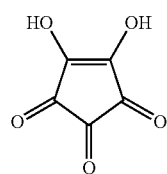

(1)

Phenazine-chloranilic acid is a compound in which phenazine represented by the following chemical formula (2) and chloranilic acid represented by the following chemical formula (3) are linked to each other through an intermolecular hydrogen bond. Phenazine-chloranilic acid exhibits a dielectric constant of about 100 at a normal temperature and a dielectric constant of about 300 at a low temperature (for example, about −10° C.). By using such an organic ferroelectric in which the dielectric constant increases at a low temperature, an effect of alleviating a decrease in the battery output in a low-temperature environment can be expected.

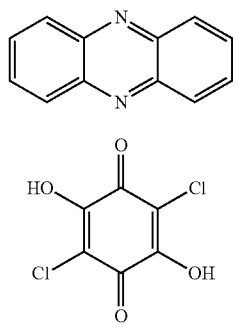

(2)

(3)

Bromanilic acid is a compound represented by the following chemical formula (4) and exhibits a dielectric constant of about 30 at a normal temperature. Bromanilic acid exhibits a characteristic in which the dielectric constant increases in a range from a normal temperature to a low temperature.

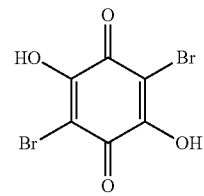

(4)

When the positive electrode mixture layer contains the organic ferroelectric, the content of the organic ferroelectric is 0.5 parts by mass to 10 parts by mass with respect to 100 parts by mass of the positive electrode active material. As described above, the dielectric constant varies in a wide range depending on the kind of the organic ferroelectric. When the content of the organic ferroelectric is 0.5 parts by mass or higher, a desired ionization promoting effect is exhibited. However, when the content of the organic ferroelectric is higher than 10 parts by mass, an active site of the electrode active material is covered with the organic ferroelectric, and a storing/releasing reaction of Li ions is also inhibited. From the viewpoint of coverage, it is preferable that the content is 0.5 parts by mass to 5 parts by mass. When the content of the organic ferroelectric is 0.5 parts by mass to 10 parts by mass, the dielectric constant of the organic ferroelectric may be, for example, about 25 to 2500, about 30 to 2500, or about 100 to 2000.

[Negative Electrode]

FIG. 4 is a schematic diagram showing a configuration example of a negative electrode according to the embodiment. As shown in FIG. 4, the negative electrode 20 is an elongated belt-shaped sheet member. The negative electrode 20 includes: a negative electrode current collector foil 21; and a negative electrode mixture layer 22 that is arranged on both main surfaces of the negative electrode current collector foil 21. The negative electrode current collector foil is, for example, a copper (Cu) foil. In the negative electrode 20, a foil exposure portion 21a where the negative electrode current collector foil 21 is exposed from the negative electrode mixture layer 22 is a portion for connection with an external terminal (negative electrode terminal 72) in the electrode body 80 (refer to FIGS. 1 and 2).

The negative electrode mixture layer contains a negative electrode active material (electrode active material). The negative electrode active material is not particularly limited. For example, the negative electrode active material may be a carbon negative electrode active material such as graphite or coke, or an alloy negative electrode active material containing silicon (Si), tin (Sn), and the like. The average particle size of the negative electrode active material is, for example, about 1 μm to 20 μm.

The negative electrode mixture layer contains the above-described organic ferroelectric. When the negative electrode mixture layer contains the organic ferroelectric, the content of the organic ferroelectric is 0.5 parts by mass to 10 parts by mass and preferably 0.5 parts by mass to 5 parts by mass with respect to 100 parts by mass of the negative electrode active material.

In addition to the negative electrode active material and the organic ferroelectric, the negative electrode mixture layer may further contain, for example, a thickener and a binder. The thickener may be, for example, carboxymethyl cellulose (CMC). The content of the thickener in the negative electrode mixture layer may be, for example, about 0.5 parts by mass to 2 parts by mass with respect to 100 parts by mass of the negative electrode active material. The binder may be, for example, styrene-butadiene rubber (SRB). The content of the binder in the negative electrode mixture layer may be, for example, about 0.5 parts by mass to 2 parts by mass with respect to 100 parts by mass of the negative electrode active material.

[Electrolytic Solution]

The electrolytic solution contains LiFSI and a nonaqueous solvent. The electrolytic solution may further contain other components as long as it contains the above components. For example, in addition to LiFSI, the electrolytic solution may contain another Li salt such as LiPF$_6$ and may contain various additives such as an overcharge additive or a solid electrolyte interface (SEI) forming agent.

LiFSI is a Li salt represented by the following chemical formula (5). According to IUPAC rules, LiFSI may also be noted as lithium bis(fluorosulfonyl)imide.

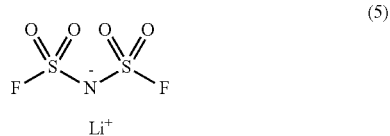

(5)

In the electrolytic solution according to the embodiment, the concentration of LiFSI is preferably 0.1 mol/L to 2.0 mol/L. In the above-described range, the number of ionized free ions and the viscosity of the electrolytic solution (that is, the ionic mobility) become well-balanced, and high electrical conductivity is easily exhibited. The lower limit of the concentration of LiFSI is more preferably 0.3 mol/L, still more preferably 0.5 mol/L, and most preferably 0.9 mol/L. The upper limit of the concentration of LiFSI is more preferably 1.8 mol/L, still more preferably 1.5 mol/L, and most preferably 1.2 mol/L.

As described above, the electrolytic solution according to the embodiment may contain another Li salt other than LiFSI. Examples of the other Li salt include LiPF$_6$, LiBF$_4$, LiClO$_4$, LiAsF$_6$, Li[(CF$_3$SO$_2$)$_2$N] (also referred to as "LiTFSI"), and Li[CF$_3$SO$_3$]. When the electrolytic solution contains another Li salt, the total concentration of LiFSI and the other Li salt is preferably 0.1 mol/L to 2.0 mol/L. At this time, a ratio (LiFSI:other Li salt) of the concentration of LiFSI to the concentration of the other Li salt is, for example, about 5:95 to 95:5. From the viewpoint of the degree of ionization, it is preferable that a ratio of the concentration of LiFSI to the total concentration of all the Li salts is higher. The ratio (LiFSI:other Li salt) of the concentration of LiFSI to the concentration of the other Li salt is preferably about 50:50 to 100:0, more preferably about 70:30 to 100:0, and still more preferably 90:10 to 100:0.

In the embodiment, the nonaqueous solvent is an aprotic organic solvent. The proportion of a high-polarity solvent in the nonaqueous solvent is 10 vol % or lower, and the balance is formed of a low-polarity solvent. The nonaqueous solvent according to the embodiment consists of only a low-polarity solvent. In this specification, an organic solvent having a dielectric constant of 10 or higher at a normal temperature (25° C.±5° C.) is referred to as "high-polarity solvent"; and an organic solvent having a dielectric constant of lower than 10 at a normal temperature is referred to as "low-polarity solvent". The upper limit of the dielectric constant of the high-polarity solvent may be, for example, 200 or 100. That is, the dielectric constant of the high-polarity solvent may be 10 to 200 or 10 to 100. The upper limit of the dielectric constant of the low-polarity solvent may be, for example, 5. That is, the dielectric constant of the low-polarity solvent may be higher than 0 and lower than 10 or higher than 0 and 5 or lower.

Examples of the high-polarity solvent having a dielectric constant of 10 or higher include ethylene carbonate (EC), propylene carbonate (PC), butylene carbonate (BC), γ-butyrolactone (GBL), γ-valerolactone (GVL), and sulfolane (SL). In the above-described compounds, a part of hydrogen (H) may be substituted with fluorine (F), chlorine (Cl), or the like as long as the dielectric constant is 10 or higher. Examples of such a compound include fluoroethylene carbonate (FEC).

Examples of the low-polarity solvent include dimethyl carbonate (DMC), ethyl methyl carbonate (EMC), diethyl carbonate (DEC), 1,2-dimethoxyethane (DME), methyl formate (MF), methyl acetate (MA), methyl propionate (MP), tetrahydrofuran (THF), 2-methyltetrahydrofuran (2-MeTHF), 1,3-dioxolane (DOL), and 4-methyl-1,3-dioxolane (4-MeDOL).

From the viewpoint of the ionic mobility, it is preferable that the proportion of the high-polarity solvent is lower. In the nonaqueous solvent according to the embodiment, the proportion of the high-polarity solvent is preferably 8 vol % or lower, more preferably 5 vol % or lower, still more preferably 3 vol % or lower, and most preferably 0 vol %.

From the viewpoint of the ionic mobility, it is preferable that the viscosity ($\eta_0$) of the nonaqueous solvent is lower. In the electrolytic solution according to the embodiment, the viscosity of the nonaqueous solvent is, for example, 0.01 mPa·s to 1.0 mPa·s, preferably 0.1 mPa·s to 0.9 mPa·s, more preferably 0.1 mPa·s to 0.8 mPa·s, and most preferably 0.1 mPa·s to 0.7 mPa·s. Here, the viscosity of the nonaqueous solvent is a value which is measured at 25° C. using a cone-plate rotational viscometer according to "JIS Z 8803: 2011, Methods For Viscosity Measurement Of Liquid".

[Separator]

The separator is a film member that prevents the contact between the positive electrode and the negative electrode while causing the electrolytic solution to penetrate thereinto. For example, the separator may be a single-layer or multi-layer microporous membrane formed of polyethylene (PE), polypropylene (PP), or the like. On a surface of the separator, a heat resistance layer may be formed. For example, the heat resistance layer is formed of inorganic particles such as alumina or a heat-resistant resin such as aramid.

Hereinabove, the embodiment has been described using the square battery as an example. However, the embodiment is not limited to the square battery. Of course, the embodiment may also be applied to, for example, a cylindrical battery or a laminate battery.

Hereinafter, the embodiment will be described using Examples. However, the embodiment is not limited to the following Examples.

[Preparation of Lithium Ion Secondary Battery]

Lithium ion secondary batteries (rated capacity: 4 Ah) according to Samples A1 to A8 and Samples B1 to B4 were prepared as follows. Here, Samples A1 to A8 correspond to Examples, and Samples B1 to B4 correspond to Comparative Examples.

[Sample A1]

1. Preparation of Positive Electrode

The following materials were prepared.

Positive electrode active material: LiNi$_{1/3}$Co$_{1/3}$Mn$_{1/3}$O$_2$
Conductive material: AB
Binder: PVDF
Solvent: NMP
Organic ferroelectric: croconic acid (solution), phenazine-chloranilic acid
Inorganic ferroelectric: BaTiO$_3$
Positive electrode current collector foil: Al foil (thickness: 15 μm)

The positive electrode active material, the conductive material, the binder, and the organic ferroelectric (croconic acid) were put into a mixing container of a planetary mixer and were kneaded with the solvent. As a result, a positive electrode mixture paste was obtained. A mass ratio (positive electrode active material:conductive material:binder) of the respective components in the positive electrode mixture paste was 90:8:2. The addition amount of the organic ferroelectric was 0.5 parts by mass with respect to 100 parts by mass of the positive electrode active material. Using a die coater, the positive electrode mixture paste obtained as described above was applied to both main surfaces of the positive electrode current collector foil and was dried. As a result, a positive electrode mixture layer was formed. The positive electrode mixture layer was rolled using a rolling mill, and the whole body of the laminate was processed to obtain a predetermined dimension. As a result, the positive electrode 10 shown in FIG. 3 was obtained.

2. Manufacture of Negative Electrode

The following materials were prepared.
Negative electrode active material: graphite
Thickener: CMC
Binder: SBR
Solvent: water
Negative electrode current collector foil: Cu foil (thickness: 10 μm)

The negative electrode active material, the thickener, the binder, and the organic ferroelectric (croconic acid) were put into a mixing container of a planetary mixer and were kneaded with the solvent. As a result, a negative electrode mixture paste was obtained. A mass ratio (negative electrode active material:thickener:binder) of the respective components in the negative electrode mixture paste was 98:1:1. The addition amount of the organic ferroelectric was 0.5 parts by mass with respect to 100 parts by mass of the negative electrode active material. Using a die coater, the negative electrode mixture paste obtained as described above was applied to both main surfaces of the negative electrode current collector foil and was dried. As a result, a negative electrode mixture layer was formed. The negative electrode mixture layer was rolled using a rolling mill, and the whole body of the laminate was processed to obtain a predetermined dimension. As a result, the negative electrode 20 shown in FIG. 4 was obtained.

3. Preparation of Electrolytic Solution

The following materials were prepared.
High-polarity solvent: EC ($\epsilon r$=about 95.3)
Low-polarity solvent: DMC ($\epsilon r$=about 3.1, $\eta_0$=about 0.59)
EMC ($\epsilon r$=about 2.9, $\eta_0$=about 0.65)
Li salt: LiFSI, LiPF$_6$ Among the above-described materials, DMC and EMC were mixed with each other at a volume ratio (DMC:EMC) of 50:50. As a result, a mixed solvent was obtained. LiFSI was dissolved in the mixed solvent such that the concentration thereof was 1.0 mol/L. As a result, an electrolytic solution containing LiFSI and the nonaqueous solvent was obtained, in which the proportion of the high-polarity solvent having a dielectric constant ($\epsilon r$) of 10 or higher in the nonaqueous solvent is 10 vol % or lower (0 vol %).

4. Construction

A separator was prepared including: a microporous membrane substrate; and a heat resistance layer that is formed on a single main surface of the microporous membrane substrate. The microporous membrane substrate was a microporous membrane having a three-layer structure of PP layer/PE layer/PP layer. The thickness of the microporous membrane substrate was 20 μm. The heat resistance layer is formed of alumina particles and an acrylic resin. The thickness of the heat resistance layer was 4 μm.

As shown in FIG. 2, the positive electrode 10 and the negative electrode 20 are laminated with the separators 40 interposed therebetween to obtain a laminate, and the obtained laminate was wound. As a result, an elliptical wound body was obtained. At this time, the heat resistance layer (not shown) of the separator 40 faced the negative electrode 20. Using a flat pressing machine, the wound body was formed into a flat shape to obtain the electrode body 80.

As shown in FIG. 1, the electrode body 80 was connected to the positive electrode terminal 70, and the negative electrode terminal 72 and then was accommodated in the square case 50. The electrolytic solution prepared as described above can be injected through a liquid injection hole (not shown) provided on the square case 50. After the injection, the liquid injection hole was sealed to seal the inside of the square case 50.

5. Initial Charging and Discharging

After the construction, the battery was charged at a current value of 4 A until the voltage reached 4.1 V. Next, the battery was discharged at a current value of 4 A until the voltage reached 3.0 V. In this way, a lithium ion secondary battery according to Sample A1 was obtained.

[Samples A2, A3, A6, and A7]

Lithium ion secondary batteries according to Samples A2, A3, A6, and A7 were prepared using the same method as in Sample A1, except that the content of the organic ferroelectric in the positive electrode mixture layer or the negative electrode mixture layer was changed as shown in Table 1.

TABLE 1

| | | Electrode Mixture Layer | | | | | | | | |
|---|---|---|---|---|---|---|---|---|---|---|
| | | Content of Ferroelectric With Respect to 100 Parts by Mass of Electrode Active Material | | Electrolytic Solution | | | | | | |
| | | Positive | Negative | | | Nonaqueous Solvent | | | Output Characteristics | |
| | | Electrode Mixture Layer | Electrode Mixture Layer | Li Salt | | High-Polarity Solvent ($\epsilon r \geq 10$) | Low-Polarity Solvent ($\epsilon r < 10$) | | Low Temperature $-10°$ C. | Normal Temperature $25°$ C. |
| Sample | Kind of Ferroelectric | Part(s) by Mass | Part(s) by Mass | Kind | Concentration mol/L | EC vol % | DMC vol % | EMC vol % | DCIR mΩ  ACIMP mΩ | DCIR mΩ |
| A1 | Croconic Acid | 0.5 | 0.5 | LiFSI | 1.0 | 0 | 50 | 50 | 6.1   8.8 | 2.3 |
| A2 | Croconic Acid | 0.5 | 0 | LiFSI | 1.0 | 0 | 50 | 50 | 6.9   9.3 | 2.5 |
| A3 | Croconic Acid | 0 | 0.5 | LiFSI | 1.0 | 0 | 50 | 50 | 6.7   9.2 | 2.6 |
| A4 | Croconic Acid | 0.5 | 0.5 | LiFSI | 1.0 | 10 | 45 | 45 | 6.3   9.1 | 2.8 |
| A5 | Croconic Acid | 0.5 | 0.5 | LiFSI:LiPF$_6$ | 0.9:0.1 | 10 | 45 | 45 | 6.2   8.9 | 3.0 |
| A6 | Croconic Acid | 5 | 5 | LiFSI | 1.0 | 0 | 50 | 50 | 6.4   8.7 | 2.6 |

TABLE 1-continued

| | | Electrode Mixture Layer | | Electrolytic Solution | | | | | | | |
| | | Content of Ferroelectric With Respect to 100 Parts by Mass of Electrode Active Material | | | | | | | | | |
| | | Positive | Negative | | | Nonaqueous Solvent | | | Output Characteristics | | |
| | | Electrode Mixture Layer | Electrode Mixture Layer | Li Salt | | High-Polarity Solvent (εr ≥ 10) | Low-Polarity Solvent (εr < 10) | | Low Temperature −10° C. | | Normal Temperature 25° C. |
| Sample | Kind of Ferroelectric | Part(s) by Mass | Part(s) by Mass | Kind | Concentration mol/L | EC vol % | DMC vol % | EMC vol % | DCIR mΩ | ACIMP mΩ | DCIR mΩ |
|---|---|---|---|---|---|---|---|---|---|---|---|
| A7 | Croconic Acid | 10 | 10 | LiFSI | 1.0 | 0 | 50 | 50 | 7.5 | 7.8 | 2.5 |
| A8 | Phenazine-Chloranilic Acid | 0.5 | 0.5 | LiFSI | 1.0 | 0 | 50 | 50 | 6.5 | 9.3 | 2.5 |
| B1 | — | 0 | 0 | LiFSI | 1.0 | 0 | 50 | 50 | 9.2 | 12.3 | 2.7 |
| B2 | — | 0 | 0 | LiFSI | 1.0 | 30 | 35 | 35 | 7.0 | 10.1 | 3.6 |
| B3 | BaTiO$_3$ | 5 | 5 | LiFSI | 1.0 | 0 | 50 | 50 | 7.9 | 9.0 | 2.6 |
| B4 | BaTiO$_3$ | 10 | 10 | LiFSI | 1.0 | 0 | 50 | 50 | 8.2 | 8.6 | 2.7 |

[Samples A4 and A5]

Lithium ion secondary batteries according to Samples A4 and A5 were prepared using the same method as in Sample A1, except that an electrolytic solution having a composition shown in Table 1 was prepared using the materials shown in "3. Preparation of Electrolytic Solution". In Table 1, the description of Sample A5 regarding the item "Li Salt" represents that LiFSI (0.9 mol/L) and LiPF$_6$ (0.1 mol/L) were dissolved in the nonaqueous solvent.

[Sample A8]

A lithium ion secondary battery according to Sample A8 was prepared using the same method as in Sample A1, except that phenazine-chloranilic acid was used as the organic ferroelectric instead of croconic acid as shown in Table 1.

[Sample B1]

A lithium ion secondary battery according to Sample B1 was prepared using the same method as in Sample A1, except that croconic acid was not added to the electrode mixture layer as shown in Table 1. Sample B1 is a comparative example in which the organic ferroelectric was not contained.

[Sample B2]

A lithium ion secondary battery according to Sample B2 was prepared using the same method as in Sample B1, except that the composition of the nonaqueous solvent was changed as shown in Table 1. Sample B2 is a comparative example in which the organic ferroelectric was not contained. The composition of the solvent in Sample B2 was adjusted in consider of the composition of a solvent in an electrolytic solution of the related art.

[Sample B3]

A lithium ion secondary battery according to Sample B3 was prepared using the same method as in Sample A6, except that solid powder of BaTiO$_3$ was used instead of croconic acid as shown in Table 1. Sample B3 is a comparative example in which the inorganic ferroelectric was used.

[Samples B4]

A lithium ion secondary battery according to Sample B4 was prepared using the same method as in Sample B3, except that the content of BaTiO$_3$ in the positive electrode mixture layer or the negative electrode mixture layer was changed as shown in Table 1. Sample B4 is a comparative example in which the inorganic ferroelectric was used.

[Evaluation]

The respective batteries obtained as described above were evaluated using the following method.

1. Measurement of Low-Temperature DC Resistance

The battery voltage was adjusted to 3.7 V. The battery was discharged at −10° C. for 0.1 seconds at a current value of 20 A, and then the maximum voltage drop amount during discharging was measured. The maximum voltage drop amount was divided by the discharge current value to calculate a DC resistance value. The results are shown in Table 1. In Table 1, "DCIV" represents a DC resistance. In Table 1, as the numerical values in the item "Output Characteristics" decrease, the output characteristics are higher.

2. Measurement of Low-Temperature AC Impedance

The battery voltage was adjusted to 3.7 V. The AC impedance of the battery was measured at −10° C. under the following conditions.

Measurement frequency range: 0.01 Hz to 100000 Hz
Voltage amplitude: 5 mV

The measurement results were plotted on a complex plane in which the horizontal axis represents the real part of the impedance and the vertical axis represents the imaginary part of the impedance, and the diameter of the drawn semicircle was measured. The results are shown in Table 1. Based on the diameter of the semicircle, the reaction resistance in the electrode can be estimated. In Table 1, "ACIMP" represents the AC impedance.

3. Measurement of Normal-Temperature DC Resistance

The battery voltage was adjusted to 3.7 V. The battery was discharged at 25° C. for 10 seconds at a current value of 40 A, and then the maximum voltage drop amount during discharging was measured. The maximum voltage drop amount was divided by the discharge current value to calculate a DC resistance value. The results are shown in Table 1.

[Results and Discussion]

1. Sample B1

It can be seen from Table 1 that, in Sample B1 in which the ferroelectric is not added to the electrode mixture layer, the DC resistance and the AC impedance at a low temperature are high. The reason for this is as follows: in Sample B1, the ionization of the Li salt was difficult to occur, and the number of free ions was small.

2. Sample B2

In Sample B2, the high-polarity solvent (EC) was added to the electrolytic solution in the configuration of Sample B1. It was found from Table 1 that, in Sample B2, the DC resistance and the AC impedance at a low temperature were lower than those in Sample B1. The reason for this is as follows: due to the addition of EC having a high dielectric constant, the ionization of the Li salt was promoted. However, on the other hand, the DC resistance at a normal temperature was high. The reason for this is as follows: due to the addition of the high-polarity solvent, the viscosity of the solvent was increased, and the ionic conductance was decreased.

3. Samples B3 and B4

It can be seen from Table 1 that, by adding the inorganic ferroelectric to the electrode mixture layer, the DC resistance and the AC impedance at a low temperature are reduced. However, it can be said that, when Samples A1 to A8 described below are compared to each other, the effects are limited. The reason is presumed to be as follows: due to poor dispersibility of the inorganic ferroelectric, the distribution of the inorganic ferroelectric in the electrode mixture layer was non-uniform, and the electrode reaction was also non-uniform.

It can be seen from a comparison between Sample B3 and Sample B4 that, when the addition amount of the inorganic ferroelectric increases, the DC resistance at a low temperature increases. The reason for this is presumed to be as follows: the inorganic ferroelectric acts as an insulator for the DC voltage.

4. Samples A1 to A8

It can be seen from Table 1 that, in Samples A1 to A8, the DC resistance and the AC impedance at a low temperature and the DC resistance at a normal temperature are low. It is considered that the superior output characteristics were exhibited due to a synergistic effect of the following (a) to (c).

(a) By adding the organic ferroelectric to the electrode mixture layer, the ionization of the Li salt in the electrode mixture layer was promoted.

(b) By using LiFSI as the Li salt, the degree of ionization of the Li salt was improved.

(c) By adjusting the proportion of the high-polarity solvent to be 10 vol % or lower, the viscosity of the solvent was decreased, and the ionic mobility was improved.

5. Sample A5

It can be seen from the result of Sample A5 in Table 1 that, even when another Li salt ($LiPF_6$) is present in the electrolytic solution, the same effect can be obtained.

6. Sample A8

It can be seen from the result of Sample A8 in Table 1 that, even when phenazine-chloranilic acid is used instead of croconic acid, the same effect was can be obtained.

7. Samples A1, A6, and A7

It can be seen from a comparison between the results of Samples A1, A6, and A7 in Table 1 that, when the content of the organic ferroelectric is 0.5 parts by mass to 5 parts by mass with respect to 100 parts by mass of the electrode active material, the effect of improving output characteristics is particularly significant. Therefore, the content of the organic ferroelectric is preferably 0.5 parts by mass to 5 parts by mass with respect to 100 parts by mass of the electrode active material.

The embodiment and Examples disclosed herein are merely exemplary in all respects and are not particularly limited.

What is claimed is:

1. A lithium ion secondary battery comprising:
   an electrode mixture layer that contains an electrode active material and an organic ferroelectric having a dielectric constant of 25 to 10,000; and
   an electrolytic solution that contains lithium bis(fluorosulfonyl)imide and a nonaqueous solvent, wherein
   the organic ferroelectric contains at least one selected from the group consisting of bromanilic acid, phenazine-chloranilic acid, and croconic acid,
   a content of the organic ferroelectric is 0.5 parts by mass to 10 parts by mass with respect to 100 parts by mass of the electrode active material, and
   a proportion of a high-polarity solvent having a dielectric constant of 10 to 200 in the nonaqueous solvent is 0 vol % to 10 vol %.

* * * * *